(12) United States Patent
Zhang et al.

(10) Patent No.: US 9,377,634 B2
(45) Date of Patent: Jun. 28, 2016

(54) POLARIZER REMOVING DEVICE AND METHOD OF USING IT

(71) Applicants: BOE TECHNOLOGY GROUP CO., LTD., Beijing (CN); BEIJING BOE DISPLAY TECHNOLOGY CO., LTD., Beijing (CN)

(72) Inventors: Wei Zhang, Beijing (CN); Xiaoliang Chu, Beijing (CN); Jie Ge, Beijing (CN); Hongtao Ma, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 34 days.

(21) Appl. No.: 14/317,044

(22) Filed: Jun. 27, 2014

(65) Prior Publication Data
US 2015/0309341 A1 Oct. 29, 2015

(30) Foreign Application Priority Data

Apr. 23, 2014 (CN) .......................... 2014 1 0165588

(51) Int. Cl.
*B32B 38/10* (2006.01)
*G02F 1/13* (2006.01)
(Continued)

(52) U.S. Cl.
CPC ............ *G02F 1/1303* (2013.01); *G02F 1/1309* (2013.01); *G02F 1/133528* (2013.01);
(Continued)

(58) Field of Classification Search
CPC .. B32B 38/10; B32B 43/006; Y10T 56/1944; Y10T 56/195; Y10T 56/1978; Y10T 56/1989; Y10T 56/1132; Y10T 56/1174

USPC ......... 156/707, 715, 758, 759, 764, 766, 924, 156/937
See application file for complete search history.

(56) References Cited

U.S. PATENT DOCUMENTS

| | | | | |
|---|---|---|---|---|
| 5,891,297 A | * | 4/1999 | Stadtmueller | ....... B29C 63/0013 156/715 |
| 8,142,610 B2 | * | 3/2012 | Tani | .......................... B08B 7/00 156/715 |
| 2008/0216955 A1 | * | 9/2008 | Neeper | ............... B29C 63/0013 156/714 |
| 2008/0236743 A1 | * | 10/2008 | Kye | .................... B29C 63/0013 156/714 |

(Continued)

FOREIGN PATENT DOCUMENTS

| | | |
|---|---|---|
| CN | 101254681 A | 9/2008 |
| CN | 101333079 A | 12/2008 |
| JP | H10282463 A | 10/1998 |

OTHER PUBLICATIONS

First Office Action regarding Chinese application No. 201410165588.6, dated Jun. 24, 2015. Translation provided by Dragon Intellectual Property Law Firm.

*Primary Examiner* — Philip Tucker
*Assistant Examiner* — Nickolas Harm
(74) *Attorney, Agent, or Firm* — Harness, Dickey & Pierce, P.L.C.

(57) ABSTRACT

The present invention provides a polarizer removing device and a method of using it. The polarizer removing device comprises a supporting unit for supporting a panel, a clamping-removing unit for clamping a polarizer and removing the polarizer from the panel, and a pressurizing unit for exerting a pressure onto the panel during the removing of the polarizer. According to the polarizer removing device, a uniform force is exerted onto the polarizer during the removal thereof. As a result, it is above to prevent the polarizer from being broken, thereby to facilitate the operation, improve the production efficiency and save an adhesive tape.

12 Claims, 5 Drawing Sheets

(51) Int. Cl.
*G02F 1/1335* (2006.01)
*B32B 43/00* (2006.01)

(52) U.S. Cl.
CPC ............... *B32B38/10* (2013.01); *B32B 43/006* (2013.01); *Y10T 156/1132* (2015.01); *Y10T 156/1174* (2015.01); *Y10T 156/195* (2015.01); *Y10T 156/1944* (2015.01); *Y10T 156/1978* (2015.01); *Y10T 156/1989* (2015.01)

(56) References Cited

U.S. PATENT DOCUMENTS

2009/0288760 A1\* 11/2009 Garben .................... B41J 29/38
156/230
2013/0048223 A1\* 2/2013 Ahn ........................ B32B 38/10
156/718

\* cited by examiner

POLARIZER REMOVING DEVICE AND METHOD OF USING IT

CROSS-REFERENCE TO RELATED APPLICATION

The present Application claims a priority of the Chinese patent application No. 201410165588.6 filed on Apr. 23, 2014 and entitled "polarizer removing device", which is incorporated herein by reference in its entirety.

FIELD OF THE INVENTION

The present invention relates to the field of display technology, in particular to a polarizer removing device and a method of using it.

DESCRIPTION OF THE PRIOR ART

During the manufacture of a liquid crystal panel, if it is found that a polarizer is shifted or there exist such defects as bubbles and dust particles after the polarizer is attached onto the panel, the polarizer must be removed, i.e., the polarizer with such defects must be peeled off from the panel, so as to re-attach the polarizer.

Usually, a polarizer removing device for carrying out the peeling-off procedure mainly has the following defects. The panel is fixed in a vacuum absorption manner, and when the polarizer is peeled off therefrom, a vacuum state will be easily broken at one corner of the panel due to an upward force exerted by a peeling-off roller on the corner, thereby an LCD optical unit will be broken. In addition, one corner of the polarizer to be peeled off is fixed to the peeling-off roller by an adhesive tape, so its operation steps are relatively complex and inconvenient, and meanwhile it will result in a waste of the adhesive tape.

SUMMARY OF THE INVENTION

An object of the present invention is to provide a polarizer removing device and a method of using it, so as to prevent an LCD optical unit from being damaged due to a broken vacuum state of a panel, to facilitate the operation, and to improve the production efficiency.

In one aspect, the present invention provides a polarizer removing device, comprising a supporting unit for supporting a panel, a clamping-removing unit for clamping a polarizer and removing the polarizer from the panel, and a pressurizing unit for exerting a pressure onto the panel during the removing of the polarizer.

In the polarizer removing device, the clamping-removing unit includes a cylindrical winding drum, on which a clamping mechanism for clamping the polarizer is arranged. The winding drum is configured to be rotated so as to wind the polarizer clamped by the clamping mechanism onto an outer surface of the winding drum.

In the polarizer removing device, a groove is provided at the outer surface of the winding drum and extends in a direction identical to an extension direction of the winding drum. The clamping mechanism includes a clamping block and a power unit. The clamping block is driven by the power unit so as to move toward an interior of the groove and cooperate with the groove, thereby to clamp the polarizer.

In the polarizer removing device, the power unit is provided within the winding drum, and includes a guiding plate, a sliding block cooperating with the guiding plate, and a cylinder. A piston rod of the cylinder is connected to the sliding block and has an axis parallel to an axis of the winding drum. An upper end of the sliding block extends through a via-hole at a bottom of the groove and is connected to the clamping block. The piston rod is configured to move the sliding block along the guiding plate toward the cylinder, so that the sliding block moves the clamping block toward the interior of the groove.

In the polarizer removing device, a compression spring is provided between the bottom of the groove and the clamping block, and a force is exerted by the compression spring onto the clamping block so as to move the clamping block toward an exterior of the groove.

In the polarizer removing device, when the piston rod of the cylinder is retracted, the clamping block clamps the polarizer, and when the piston rod of the cylinder is stretched, the clamping block can release the polarizer under the effect of the compression spring, so as to fix, peel off and release the polarizer.

In the polarizer removing device, an antiskid rack is provided at an inner surface of the clamping block, the inner surface faces the groove, and an outer surface of the clamping block is of an arc shape so as to be fit to the outer surface of the winding drum.

In the polarizer removing device, there are two power units, and the piston rods of the cylinders thereof are arranged face to face. The two power units are symmetrical with respect to a vertical center line of the winding drum.

In the polarizer removing device, the pressurizing unit is a pressurizing roller, which is configured to be rotated so as to exert a force onto the panel during the removing of the polarizer.

In the polarizer removing device, the supporting unit includes a base, and a platen connected to the base and configured to support the panel. A supporting plate is mounted at a side of the platen so as to support a circuit board on the panel, and an edge of the supporting plate is tightly adhered to an edge of the platen.

In the polarizer removing device, an upright plate is connected to a bottom surface of the supporting plate, and a chute extending vertically is provided on the upright plate. The upright plate is vertically slidably connected to a side of the platen via a bolt that passes through the chute and that is fixed onto the side of the platen.

In the polarizer removing device, the platen is rotatably connected to the base via a spindle that is fixedly connected to the platen. A projecting plate that projects outward is provided at a surface of the spindle, and a thrust fixing unit that cooperates with the projecting plate is provided on the base. The thrust fixing unit includes two thrusters provided at both sides of the projecting plate, respectively, each of which includes a seat fixed onto the base and a screw passing through a threaded hole in the seat and facing the projecting plate. The screw is configured to exert a thrust onto the projecting plate, so as to fix the platen.

In the polarizer removing device, the two thrusters provided at both sides of the projecting plate may operate individually so as to fix the platen, or exert the thrust onto the projecting plate from both sides of the projecting plate simultaneously so as to fix the platen.

In another aspect, the present invention provides a polarizer removing method using the above-mentioned polarizer removing device, comprising: peeling off a polarizer from a starting corner thereof, placing the starting corner into a clamping-removing unit and clamping it; rotating the clamping-removing unit toward a corner of the polarizer opposite to the starting corner; and pressurizing, by a pressurizing unit, a panel at a rear side of the clamping-removing unit, and rotating the pressurizing unit together with the clamping-removing unit.

In the polarizer removing method, a supporting unit includes a base, and a platen connected to the base and configured to support the panel. Prior to placing the starting corner of the polarizer into the clamping-removing unit, the method further comprises rotating the platen by a certain degree.

In the polarizer removing method, a rotation angle of the platen is adjusted by a screw, so as to conveniently adjust an angle between the panel and the clamping-removing unit, thereby to facilitate to peel off the polarizer.

In the polarizer removing method, the clamping-removing unit includes a completed cylindrical winding drum. The winding drum rotatably moves during the removing of the polarizer, so as to wind the polarizer onto its outer surface and remove the polarizer. After the removing of the polarizer, the winding drum rotates in an opposite direction so as to recycle the polarizer.

According to the polarizer removing device and the polarizer removing method of the present invention, a uniform force is exerted onto the polarizer during the removal thereof. As a result, it is above to prevent the polarizer from being broken, thereby to facilitate the operation, improve the production efficiency and save an adhesive tape.

DETAILED DESCRIPTION OF THE PREFERRED EMBODIMENTS

In order to enable a person skilled in the art to understand and carry out the present invention in a better manner, the present invention will be described hereinafter in conjunction with the drawings and the embodiments, but the following embodiments shall not be used to limit the present invention.

Figure 1:
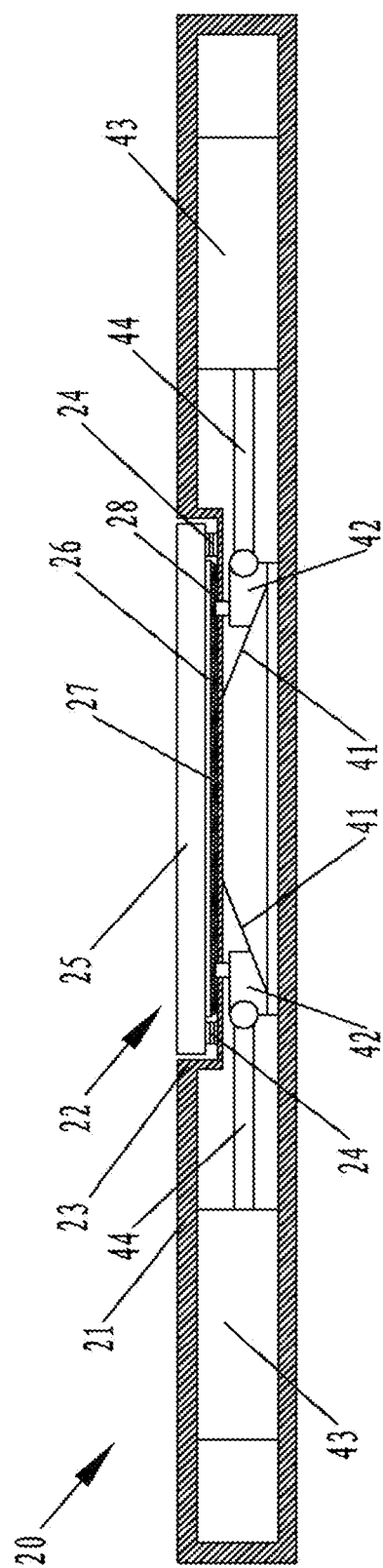
FIG. 1 is a schematic view showing a clamping-removing unit of a polarizer removing device according to the present invention.
Figure 2:
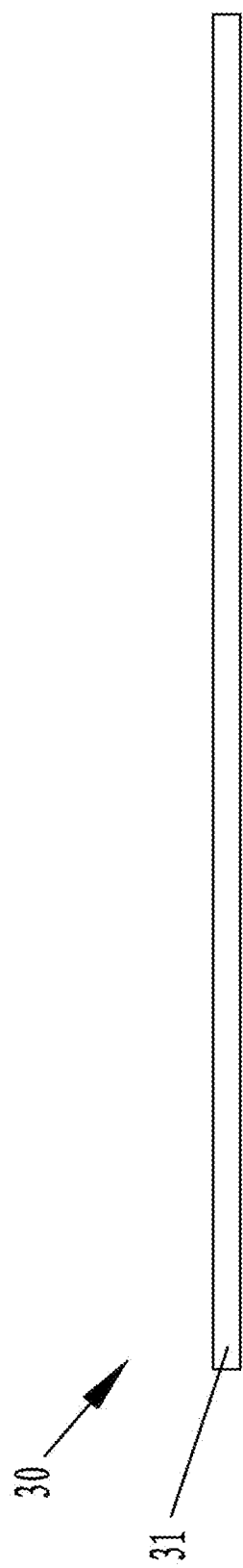
FIG. 2 is a schematic view showing a pressuring unit of the polarizer removing device according to the present invention.
Figure 3:
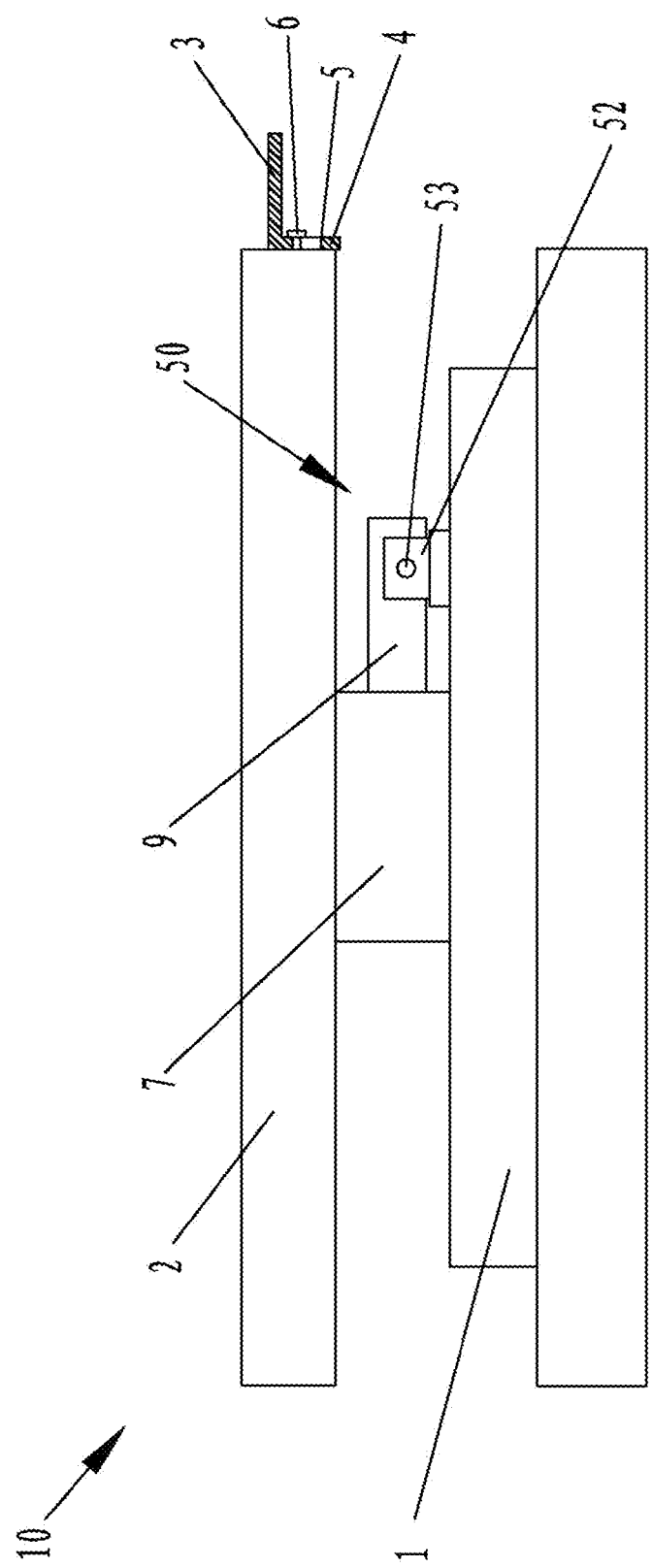
FIG. 3 is a front view showing a supporting unit of the polarizer removing device according to the present invention.

As shown in FIGS. 1-3, a polarizer removing device of the present invention comprises a supporting unit 10 for supporting and absorbing a panel, a clamping-removing unit 20 for clamping a polarizer and removing the polarizer from the panel, and a pressurizing unit 30 for exerting a pressure onto the panel during the removing of the polarizer.

The clamping-removing unit 20 includes a cylindrical winding drum 21, on which a clamping mechanism 22 for clamping the polarizer is arranged. The winding drum 21 is configured to be rotated so as to wind the polarizer clamped by the clamping mechanism 22 onto an outer surface of the winding drum 21.

A groove 23 is provided at the outer surface of the winding drum 21 and extends in a direction identical to an extension direction of the winding drum 21. The clamping mechanism 22 includes a clamping block 25 and a power unit. The clamping block 25 is driven by the power unit so as to move toward an interior of the groove 23 and cooperate with the groove 23, thereby to clamp the polarizer.

The power unit is provided within the winding drum 21, and includes a guiding plate 41, a sliding block 42 cooperating with the guiding plate 41, and a cylinder 43. The guiding plate 41 is fixed within the winding drum 21. A piston rod 44 of the cylinder 43 is connected to the sliding block 42 and has an axis parallel to an axis of the winding drum 21. An upper end of the sliding block 42 extends through a via-hole 28 at a bottom 27 of the groove 23 and is connected to the clamping block 25. The guiding plate 41 is provided with an oblique surface. One end of the oblique surface away from the piston rod 44 is tilted upward (i.e., toward the clamping block 25), and one end of the oblique surface adjacent to the piston rod 44 is tilted downward. The piston rod 44 is configured to move the sliding block 42 along the guiding plate 41 toward the cylinder 43, so that the sliding block 42 pulls the clamping block 25 to move toward the interior of the groove 23. To be specific, the piston rod 44 is configured to move the sliding block 42 along the oblique surface of the guiding plate 41 toward the cylinder 43, so that the sliding block 42 moves the clamping block 25 toward the interior of the groove 23, and thereby the clamping block 25 cooperates with the groove 23 so as to clamp the polarizer.

A compression spring 24 is provided between the bottom 27 of the groove 23 and the clamping block 25, and a force is exerted by the compression spring 24 onto the clamping block 25 so as to move the clamping block 25 to an exterior of the groove 23.

An antiskid rack 26 is provided at an inner surface of the clamping block 25, the inner surface faces the groove 23, and an outer surface of the clamping block 25 is of an arc shape so as to be fit to the outer surface of the winding drum 21.

In the polarizer removing device, there are two power units, and the piston rods 44 of the cylinders 43 thereof are arranged opposite to each other. In other words, the piston rods 44 are arranged face to face, extending from their respective cylinder generally toward each other. The two power units are symmetrical with respect to a vertical center line of the winding drum 21.

The pressurizing unit 30 is a pressurizing roller 31, which is configured to be rotated so as to exert a force onto the panel during the removing of the polarizer.

Figure 4:
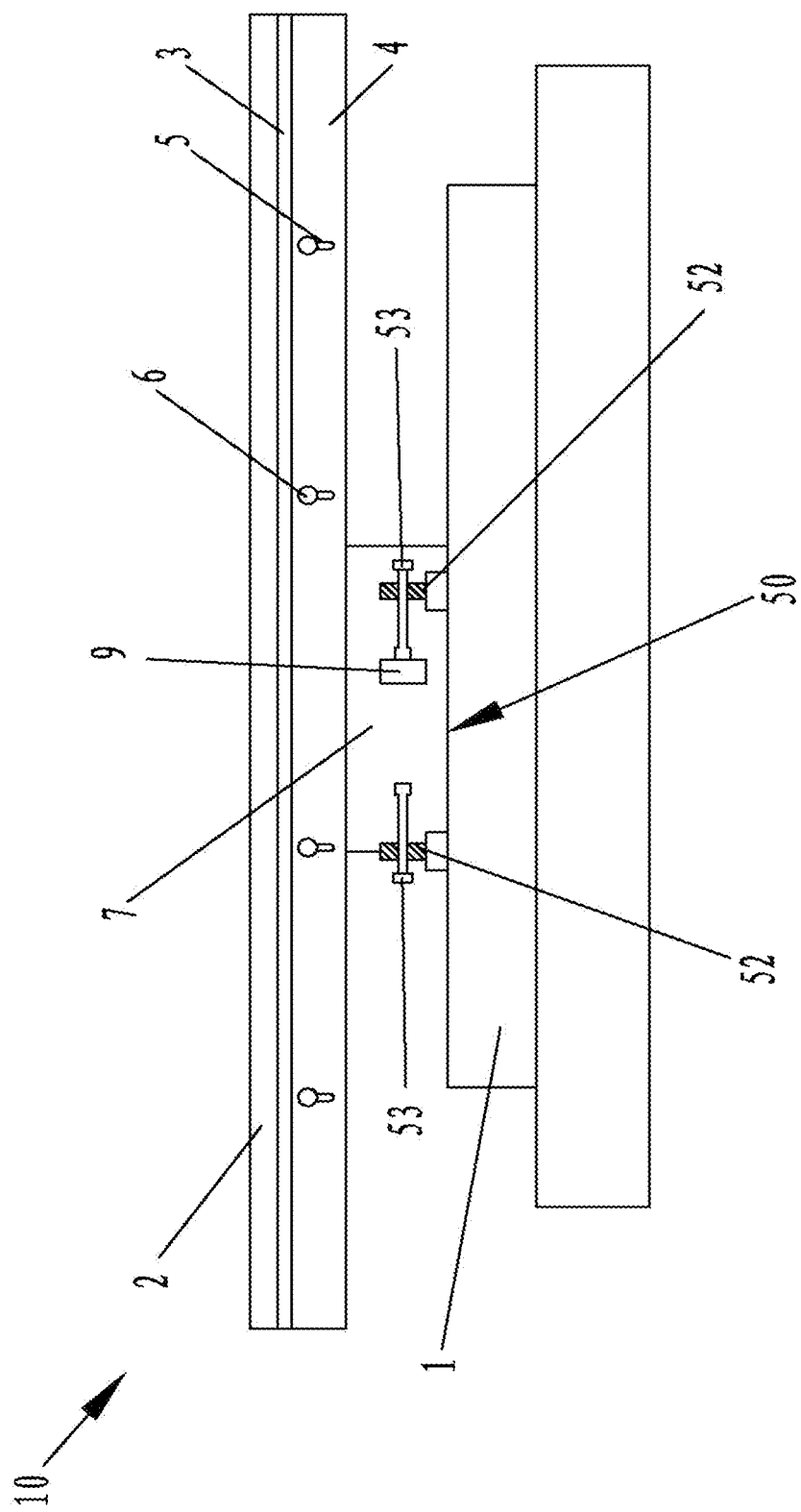
FIG. 4 is a right view showing the supporting unit of the polarizer removing device according to the present invention.

Referring to FIG. 4, the supporting unit 10 includes a base 1, and a platen 2 connected to the base 1 and configured to support and absorb the panel. A supporting plate 3 is mounted at a side of the platen 2 so as to support a circuit board on the panel, and an edge of the supporting plate 3 is tightly adhered to an edge of the platen 2.

An upright plate 4 is connected to a bottom surface of the supporting plate 3, and a chute 5 extending vertically is provided on the upright plate 4. The upright plate 4 is vertically slidably connected to a side of the platen 2 via a bolt 6 that passes through the chute 5 and that is fixed onto the side of the platen 2.

The platen 2 is rotatably connected to the base 1 via a spindle 7 that is fixedly connected to the platen 2. A projecting plate 9 that projects outward is provided at a surface of the spindle 7, and a thrust fixing unit 50 that cooperates with the projecting plate 9 is provided on the base 1. The thrust fixing unit 50 includes two thrusters provided at both sides of the projecting plate 9, respectively, each of which includes a seat 52 fixed onto the base 1 and a screw 53 passing through a threaded hole in the seat 52 and facing the projecting plate 9. The screw 53 is configured to exert a thrust onto the projecting plate 9, so as to fix the platen 2.

The screws 53 of the two thrusters provided at both sides of the projecting plate 9 are configured to exert the thrust onto the projecting plate 9 from both sides of the projecting plate 9, respectively. The two thrusters may operate individually so as to fix the platen 2, or exert the thrust onto the projecting plate 9 from both sides of the projecting plate 9 simultaneously so as to fix the platen 2.

According to the polarizer removing device of the present invention, when the supporting unit 10 provides vacuum absorption to the panel, the pressurizing roller 31 is provided so as to press a starting corner of the polarized to be peeled off, so as to effectively prevent an LCD optical unit from being damaged due to the broken vacuum state of the panel. In addition, the clamping block 25 is provided at a middle part of the winding drum 21, and the outer surface of the clamping block 25 is of an arc shape so as to be fit to the outer surface of the winding drum 21. During the removing of the polarizer, the clamping block 25 may clamp one corner of the polarizer and forms a completed cylindrical body with the entire winding drum 21. When the winding drum 21 rotates so as to remove the polarizer, a uniform force will be exerted onto the polarizer, and the polarizer will uneasily be broken. As a result, it is able to facilitate the operation, improve the production efficiency and save the adhesive tape.

Figure 5:
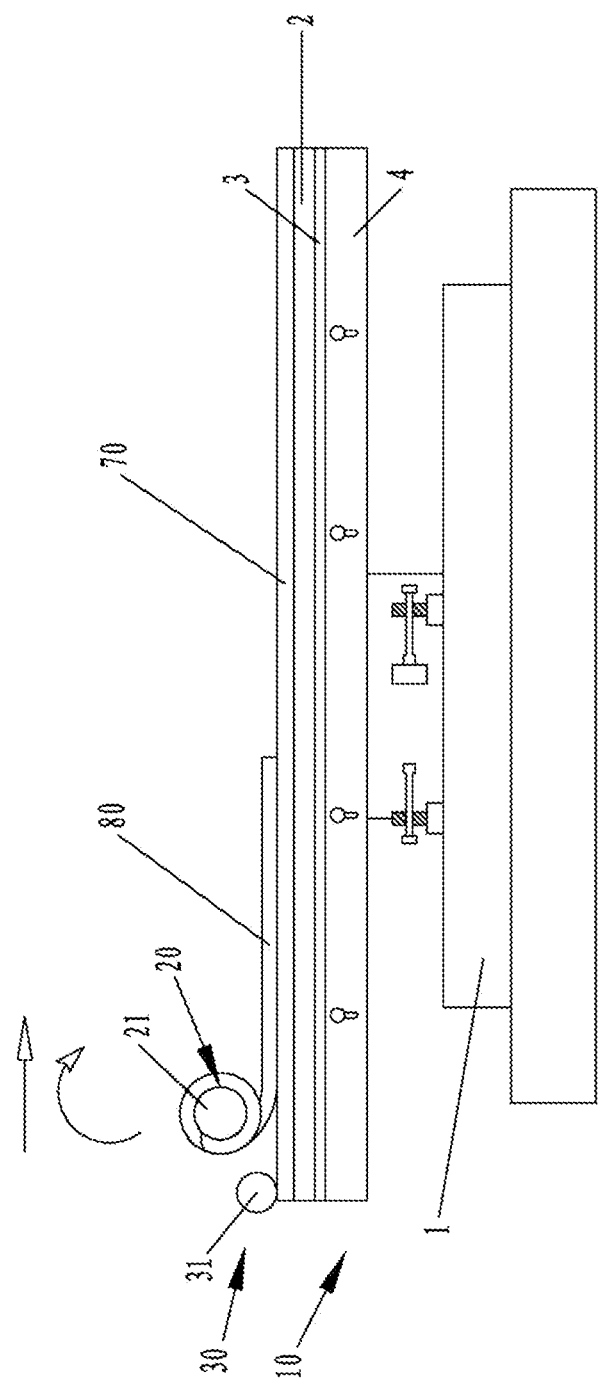
FIG. 5 is a use status view showing the polarizer removing device according to the present invention.

Referring to FIG. 5, the working procedure of the polarizer removing device will be described hereinafter.

At first, a corner of the polarizer 80 is peeled off, and after the platen 2 rotates by a certain degree, the corner of the polarizer 80 (i.e., the starting corner) is placed within the clamping mechanism 22 of the clamping-removing unit 20 and clamped thereby. The winding drum 21 rotates toward another corner of the polarizer 80 opposite to the starting corner, and the pressurizing roller 31 of the pressurizing unit 30 presses the panel 70 down at a rear side of the winding drum 21. Then, the pressurizing roller 31 rotates along with the winding drum 21. Arrows in FIG. 5 show the rotation direction and the movement direction of the pressurizing roller 31 and the winding drum 21. The rotation of the pressurizing roller 31 with the winding drum 21 may effectively prevent, during the removing of the polarizer, the panel 70 from moving with the winding drum 21 after the vacuum state of the panel 70 is broken due to the lift-up of one corner of the panel 70, thereby prevent the panel 70 from being damaged. The winding drum 21 rotates to the other side of the panel 70, and during the rotation, the polarizer 80 will be removed from the panel 70.

According to the polarizer removing device of the present invention, the power unit is provided within the winding drum 21, and under the effect of the power unit, the clamping block 25 can clamp the polarizer. When the piston rod 44 of the cylinder 43 is retracted, the clamping block 25 clamps the polarizer, and when the piston rod 44 of the cylinder 43 is stretched, the clamping block 25 may release the polarizer under the effect of the compression spring 24. As a result, it is able to recycle the waste polarizer after fixing, removing and releasing it.

The winding drum 21 of the polarizer removing device may move rotatably during the removal, so as to wind the polarizer onto its outer surface. After the polarizer is removed, the winding drum 21 may rotate in an opposite direction so as to release the clamping block 25, thereby to recycle the polarizer.

The clamping block 25 of the polarizer removing device may form a completed cylindrical body with the winding drum 21, so that a uniform force is exerted onto the polarizer during the removal and the polarizer is uneasily broken. In addition, an antiskid structure (the antiskid rack 26) is provided on the clamping block 25, so as to prevent the corner of the polarizer from slipping off and ensure that the polarizer, after being clamped, will not be broken, thereby to improve the success rate of removing the polarizer.

The supporting plate 3 for supporting the circuit board on the panel is mounted at the side of the supporting unit 10, and the edge of the supporting plate 3 is tightly adhered to the edge of the platen 2. A height of the supporting plate 3 may be adjusted by unit of the cooperation of the chute 5 and the bolt 5.

The supporting unit of the polarizer removing device can effectively prevent an electronic element on the circuit board from being damaged due to the interference of the electronic element with the pressurizing roller 31 during the press-down of the panel.

According to the supporting unit of the polarizer removing device of the present invention, the thrust fixing unit 50 cooperating with the projecting plate 9 is provided on the base 1, and the rotation angle of the platen 2 may be adjusted via the screw 53. As a result, it is able to conveniently adjust the angle between the panel and winding drum 21, thereby to facilitate the removing of the polarizer. To be specific, the screw 53 is rotated so as to rotate the platen 2, thereby to adjust the rotation angle of the platen 2. In addition, an external thread of the screw 53 may be in engagement with an internal thread of the threaded hole in the seat 52, so as to fix the screw 53

The above are merely the preferred embodiments of the present invention. It should be appreciated that, a person skilled in the art may make further improvements and modifications without departing from the principle of the present invention, and these improvements and modifications shall also be considered as the scope of the present invention.

What is claimed is:

1. A polarizer removing device, comprising a supporting unit for supporting a panel, a clamping-removing unit for clamping a polarizer and removing the polarizer from the panel, and a pressurizing unit for exerting a pressure onto the panel during the removing of the polarizer;

wherein the clamping-removing unit comprises a cylindrical winding drum, on which a clamping mechanism for clamping the polarizer is arranged, the winding drum being configured to be rotated so as to wind the polarizer clamped by the clamping mechanism onto an outer surface of the winding drum;

wherein a groove is provided in the outer surface of the winding drum and extends in a direction identical to an extension direction of the winding drum;

wherein the clamping mechanism comprises a clamping block and a power unit, the clamping block being driven by the power unit so as to move toward an interior of the groove and cooperate with the groove, thereby to clamp the polarizer;

wherein the power unit is provided within the winding drum, and comprises a guiding plate, a sliding block cooperating with the guiding plate, and a cylinder;

wherein a piston rod of the cylinder is connected to the sliding block and has an axis parallel to an axis of the winding drum;

wherein an upper end of the sliding block extends through a via-hole at a bottom of the groove and is connected to the clamping block; and wherein the piston rod is configured to move the sliding block along the guiding plate toward the cylinder, so that the sliding block moves the clamping block toward the interior of the groove.

2. The polarizer removing device according to claim 1, wherein
a compression spring is provided between the bottom of the groove and the clamping block, and a force is exerted by the compression spring onto the clamping block so as to move the clamping block toward an exterior of the groove.

3. The polarizer removing device according to claim 2, wherein
when the piston rod of the cylinder is retracted, the clamping block clamps the polarizer, and
when the piston rod of the cylinder is stretched, the clamping block releases the polarizer under an effect of the compression spring, so as to fix, peel off and release the polarizer.

4. The polarizer removing device according to claim 1, wherein
an antiskid rack is provided at an inner surface of the clamping block, the inner surface faces the groove, and an outer surface of the clamping block is of an arc shape so as to be fit to the outer surface of the winding drum.

5. The polarizer removing device according to claim 1, wherein
there are two power units, each power unit having a cylinder,
piston rods of the cylinders of the two power units are arranged face to face, and
the two power units are symmetrical with respect to a vertical center line of the winding drum.

6. The polarizer removing device according to claim 1, wherein
the pressurizing unit is a pressurizing roller, which is configured to be rotated so as to exert a force onto the panel during the removing of the polarizer.

7. The polarizer removing device according to claim 1, wherein
the supporting unit includes a base, and a platen connected to the base and configured to support the panel,
a supporting plate is mounted at a side of the platen so as to support a circuit board on the panel, and
an edge of the supporting plate is adhered to an edge of the platen.

8. The polarizer removing device according to claim 7, wherein
an upright plate is connected to a bottom surface of the supporting plate,
a chute extending vertically is provided on the upright plate, and
the upright plate is vertically slidably connected to a side of the platen via a bolt that passes through the chute and that is fixed onto the side of the platen.

9. The polarizer removing device according to claim 8, wherein
the platen is rotatably connected to the base via a spindle that is fixedly connected to the platen,
a projecting plate that projects outward is provided at a surface of the spindle,
a thrust fixing unit that cooperates with the projecting plate is provided on the base,
the thrust fixing unit comprises two thrusters provided at both sides of the projecting plate, respectively, each of the two thrusters comprises a seat fixed onto the base and a screw passing through a threaded hole in the seat and facing the projecting plate, and
the screw is configured to exert a thrust onto the projecting plate, so as to fix the platen.

10. The polarizer removing device according to claim 9, wherein
the two thrusters provided at both sides of the projecting plate operate individually so as to fix the platen, or exert the thrust onto the projecting plate from both sides of the projecting plate simultaneously so as to fix the platen.

11. A polarizer removing method using the polarizer removing device according to claim 1, comprising:
peeling off a polarizer from a starting corner thereof, placing the starting corner into a clamping-removing unit and clamping it;
rotating the clamping-removing unit toward a corner of the polarizer opposite to the starting corner; and
pressurizing, by a pressurizing unit, a panel at a rear side of the clamping-removing unit, and rotating the pressurizing unit together with the clamping-removing unit;
wherein a supporting unit includes a base, and a platen connected to the base and configured to support the panel, and
prior to placing the starting corner of the polarizer into the clamping-removing unit, the method further comprises rotating the platen by a certain angle;
wherein a rotation angle of the platen is adjusted by a screw, so as to adjust an angle between the panel and the clamping-removing unit, thereby to peel off the polarizer.

12. The polarizer removing method according to claim 11, wherein
the clamping-removing unit includes a cylindrical winding drum,
the winding drum rotatably moves during the removing of the polarizer, so as to wind the polarizer onto its outer surface and remove the polarizer, and
after the removing of the polarizer, the winding drum rotates in an opposite direction so as to recycle the polarizer.

* * * * *